(12) United States Patent
Meyers et al.

(10) Patent No.: US 11,695,543 B2
(45) Date of Patent: Jul. 4, 2023

(54) BLOCKCHAIN NETWORK CONTROL SYSTEM AND METHODS

(71) Applicant: Myndshft Technologies, Inc., Dover, DE (US)

(72) Inventors: Stephen J. Meyers, Phoenix, AZ (US); Alec D Iverson, Mesa, AZ (US)

(73) Assignee: Myndshft Technologies, Inc., Mesa, AZ (US)

( * ) Notice: Subject to any disclaimer, the term of this patent is extended or adjusted under 35 U.S.C. 154(b) by 364 days.

(21) Appl. No.: 16/998,828

(22) Filed: Aug. 20, 2020

(65) Prior Publication Data
US 2021/0058234 A1 Feb. 25, 2021

Related U.S. Application Data

(60) Provisional application No. 62/890,363, filed on Aug. 22, 2019.

(51) Int. Cl.
*H04L 9/06* (2006.01)
*H04L 9/08* (2006.01)
(Continued)

(52) U.S. Cl.
CPC .......... *H04L 9/0637* (2013.01); *H04L 9/0847* (2013.01); *H04L 9/3265* (2013.01); *H04L 9/50* (2022.05)

(58) Field of Classification Search
CPC .. G06F 16/2379; G06F 16/23; G06F 16/2455; G06F 3/0647; G06F 3/0632;
(Continued)

(56) References Cited

U.S. PATENT DOCUMENTS

2013/0007442 A1* 1/2013 Mao ...................... H04L 9/3268
    713/156
2018/0341930 A1* 11/2018 Moir ................... G06Q 20/0655
(Continued)

FOREIGN PATENT DOCUMENTS

WO 2018148067 A1 8/2018
WO 2019067988 A1 4/2019

*Primary Examiner* — Abu S Sholeman
(74) *Attorney, Agent, or Firm* — Booth Udall Fuller, PLC

(57) ABSTRACT

A blockchain network control system and method is disclosed. The system includes a processor coupled to a storage comprising a plurality of network entity definitions each defining a different network entity that make up a target network architecture for a permissioned blockchain network. The system also includes a control object communicatively coupled to an ordering service and a plurality of organizations. The plurality of organizations was established by the blockchain network control system by instantiating the organizational membership service provider, registering and enrolling each peer node within each organization, storing the cryptographic identity generated for the peer node, and then instantiating the plurality of peer nodes. The ordering service was established by the blockchain network control system by instantiating the ordering membership service provider, registering and enrolling each orderer node belonging to the ordering service, storing the cryptographic identity generated for the orderer node, and then instantiating the orderer nodes.

20 Claims, 7 Drawing Sheets

(51) Int. Cl.
*H04L 9/32* (2006.01)
*H04L 9/00* (2022.01)

(58) Field of Classification Search
CPC . G06F 9/45558; H04L 9/0643; H04L 9/0637; H04L 9/0847; H04L 9/3265; H04L 9/50; H04L 63/0823; H04L 2209/88; H04L 9/3239; H04L 63/0407; H04L 2209/56; H04L 9/3236; H04L 67/104; G06Q 20/40; G06Q 20/02
See application file for complete search history.

(56) References Cited

U.S. PATENT DOCUMENTS

| | | | |
|---|---|---|---|
| 2019/0188706 A1* | 6/2019 | McCurtis | G06Q 20/40 |
| 2019/0205870 A1* | 7/2019 | Kamalsky | H04L 9/30 |
| 2019/0243572 A1 | 8/2019 | Kursun | |
| 2019/0391979 A1* | 12/2019 | Bistram | G06F 16/27 |
| 2020/0073962 A1* | 3/2020 | Natarajan | H04L 9/0643 |
| 2020/0167339 A1* | 5/2020 | Manevich | G06F 16/2255 |
| 2020/0250683 A1* | 8/2020 | Padmanabhan | G06Q 20/38215 |
| 2020/0279262 A1* | 9/2020 | Wang | G06Q 40/02 |
| 2021/0027265 A1* | 1/2021 | Hasek, IV | G06Q 20/1235 |
| 2021/0182423 A1* | 6/2021 | Padmanabhan | G06F 21/6245 |

* cited by examiner

BLOCKCHAIN NETWORK CONTROL SYSTEM AND METHODS

RELATED APPLICATIONS

This application claims the benefit of U.S. provisional patent application 62/890,363, filed Aug. 22, 2019 titled "Blockchain Network Control System And Methods," the entirety of the disclosure of which is hereby incorporated by this reference.

TECHNICAL FIELD

Aspects of this document relate generally to blockchain network control.

BACKGROUND

Many industries, such as healthcare, are built upon many different sub-industries that must all work together, despite sometimes having divergent business interests. The use of permissioned blockchain networks allows different parties to interact, share information, and even automate inter-party processes while relying on an immutable transaction ledger to keep everyone honest. However, permissioned blockchain networks require a great deal of careful configuration to set up and maintain. In particular, establishing permissions, authenticated identities, and certificates can be delicate and time consuming, which may be further complicated in dynamic networks that grow and shrink depending on the demands being placed on the network.

SUMMARY

According to one aspect, a blockchain network control system includes a processor communicatively coupled to a memory and a network interface, the network interface communicatively coupled to a physical network. The system also includes a storage communicatively coupled to the processor, the storage having a plurality of network entity definitions (NEDs) each defining a different network entity of a plurality of network entities that make up a target network architecture for a permissioned blockchain network. Each network entity of the plurality of network entities is one of an ordering service having a plurality of orderer nodes and an ordering membership service provider configured to verify that signatures were generated by a valid cryptographic identity and issued by the ordering service, and one of a plurality of organizations, each organization of the plurality of organizations having a plurality of peer nodes and an organizational membership service provider configured to verify that signatures were generated by a valid cryptographic identity within the organization and issued by the organization. The system further includes at least one control object instantiated within the permissioned blockchain network and communicatively coupled, through the permissioned blockchain network, to an ordering service and a plurality of organizations. The plurality of organizations was established by the blockchain network control system using the plurality of NEDs by, for each organization of the plurality of organizations, instantiating the organizational membership service provider as defined by the NED for the organization, and, for each peer node of the plurality of peer nodes belonging to the organization as defined by the NED, registering the peer node with the organizational membership service provider of the organization by providing identifying information specified in the NED for the peer node to the organizational membership service provider, enrolling the peer node by generating a cryptographic identity for the peer node using the organizational membership service provider, and storing the cryptographic identity generated for the peer node. The plurality of organizations was also established by instantiating the plurality of peer nodes as defined by the NED. The ordering service of the permissioned blockchain network was established by the blockchain network control system by instantiating the ordering membership service provider as defined by the NED for the ordering service, and, for each orderer node of the plurality of orderer nodes belonging to the ordering service as defined by the NED, registering the orderer node with the ordering membership service provider by providing identifying information specified in the NED for the orderer node to the ordering membership service provider, enrolling the orderer node by generating a cryptographic identity for the orderer node using the ordering membership service provider, and storing the cryptographic identity generated for the orderer node. The organizations were also established by instantiating the plurality of orderer nodes as defined by the NED. The processor is configured to store the cryptographic identities generated for the peer nodes and orderer nodes by sending each cryptographic identity to a cloud storage communicatively coupled to the blockchain network control system through the physical network, and storing, for each cryptographic identity stored in the cloud storage, cryptographic material allowing access to the cryptographic identity in the cloud storage, the cryptographic material being stored in the NED associated with the cryptographic identity. The processor is also configured to compare the permissioned blockchain network with the target network architecture as defined by the plurality of NEDs, as well as destroy at least a portion of the permissioned blockchain network in response to detecting a deviation between the at least a portion of the permissioned blockchain network and the target network architecture. The processor is also configured to regenerate the permissioned blockchain network by instantiating the portion of the target network architecture that was destroyed, using at least one NED describing the destroyed portion, thereby reconciling the permissioned blockchain network with the target network architecture. Each peer node of the plurality of peer nodes retrieves its own cryptographic identity from the cloud storage using the cryptographic material stored in the associated NED as part of being instantiated. Each orderer node of the plurality of orderer nodes retrieves its own cryptographic identity from the cloud storage using the cryptographic material stored in the associated NED as part of being instantiated. Additionally, for at least one organization of the plurality of organizations of the permissioned blockchain network, the peer nodes include at least one smart contract that is distributed to the peer nodes by the blockchain network control system after each peer node is instantiated. The at least one smart contract is defined within the NED associated with each of the at least one organization. Each ordering membership service provider and each organizational membership service provider of the permissioned blockchain network comprises a root certificate authority node and an intermediate certificate authority node.

Particular embodiments may comprise one or more of the following features. The permissioned blockchain network may further include a plurality of channels established by the blockchain network control system, each channel having the at least one control object of the blockchain network control system and/or at least one network entity. Each NED of the plurality of NEDs may define channel membership for the network entity defined by the NED. The processor of the blockchain network control system may be configured to monitor each channel and maintain the target network architecture for each channel. The processor may be further configured to instantiate at least one of additional peer nodes and additional orderer nodes in response to an increase in demand for at least one the ordering service and at least one of the plurality of organization. At least one NED may define a portion of the target network architecture as having an unbounded number of nodes.

According to another aspect of the disclosure, a blockchain network control system includes a processor communicatively coupled to a memory and a network interface, the network interface communicatively coupled to a physical network, and a storage communicatively coupled to the processor. The storage includes a plurality of network entity definitions (NEDs) each defining a different network entity of a plurality of network entities that make up a target network architecture for a permissioned blockchain network. Each network entity of the plurality of network entities is one of an ordering service having a plurality of orderer nodes and an ordering membership service provider configured to verify that signatures were generated by a valid cryptographic identity and issued by the ordering service, and one of a plurality of organizations. Each organization of the plurality of organizations includes a plurality of peer nodes and an organizational membership service provider configured to verify that signatures were generated by a valid cryptographic identity within the organization and issued by the organization. The storage also includes at least one control object instantiated within the permissioned blockchain network and communicatively coupled, through the permissioned blockchain network, to an ordering service and a plurality of organizations. The plurality of organizations was established by the blockchain network control system using the plurality of NEDs by, for each organization of the plurality of organizations, by instantiating the organizational membership service provider as defined by the NED for the organization, and, for each peer node of the plurality of peer nodes belonging to the organization as defined by the NED, registering the peer node with the organizational membership service provider of the organization by providing identifying information specified in the NED for the peer node to the organizational membership service provider, enrolling the peer node by generating a cryptographic identity for the peer node using the organizational membership service provider, and storing the cryptographic identity generated for the peer node. The organizations were also established by instantiating the plurality of peer nodes as defined by the NED. The ordering service of the permissioned blockchain network was established by the blockchain network control system by instantiating the ordering membership service provider as defined by the NED for the ordering service, and, for each orderer node of the plurality of orderer nodes belonging to the ordering service as defined by the NED, registering the orderer node with the ordering membership service provider by providing identifying information specified in the NED for the orderer node to the ordering membership service provider, enrolling the orderer node by generating a cryptographic identity for the orderer node using the ordering membership service provider, and storing the cryptographic identity generated for the orderer node. The ordering service was also established by instantiating the plurality of orderer nodes as defined by the NED.

Particular embodiments may comprise one or more of the following features. For at least one organization of the plurality of organizations of the permissioned blockchain network, the peer nodes may include at least one smart contract that may be distributed to the peer nodes by the blockchain network control system after each peer node is instantiated. The at least one smart contract may be defined within the NED associated with each of the at least one organization. The permissioned blockchain network may further include a plurality of channels established by the blockchain network control system, each channel having the at least one control object of the blockchain network control system and/or at least one network entity. Each NED of the plurality of NEDs may define channel membership for the network entity defined by the NED. The processor of the blockchain network control system may be configured to monitor each channel and maintain the target network architecture for each channel. The processor may be further configured to store the cryptographic identities generated for the peer nodes and orderer nodes by sending each cryptographic identity to a cloud storage communicatively coupled to the blockchain network control system through the physical network, and/or storing, for each cryptographic identity stored in the cloud storage, cryptographic material allowing access to the cryptographic identity in the cloud storage. The cryptographic material may be stored in the NED associated with the cryptographic identity. Each peer node of the plurality of peer nodes may retrieve its own cryptographic identity from the cloud storage using the cryptographic material stored in the associated NED as part of being instantiated. Each orderer node of the plurality of orderer nodes may retrieve its own cryptographic identity from the cloud storage using the cryptographic material stored in the associated NED as part of being instantiated. Each ordering membership service provider and/or each organizational membership service provider of the permissioned blockchain network may include a root certificate authority node and/or an intermediate certificate authority node. The processor may be further configured to instantiate at least one of additional peer nodes and additional orderer nodes in response to an increase in demand for at least one the ordering service and at least one of the plurality of organization. At least one NED may define a portion of the target network architecture as having an unbounded number of nodes. The processor may be further configured to compare the permissioned blockchain network with the target network architecture as defined by the plurality of NEDs. The processor may also be configured to destroy at least a portion of the permissioned blockchain network in response to detecting a deviation between the at least a portion of the permissioned blockchain network and the target network architecture. The processor may also be configured to regenerate the permissioned blockchain network by instantiating the portion of the target network architecture that was destroyed, using at least one NED describing the destroyed portion, thereby reconciling the permissioned blockchain network with the target network architecture.

According to yet another aspect of the disclosure, a method for controlling a permissioned blockchain network includes defining the permissioned blockchain network within a blockchain network control (BNC) system, the BNC system having a storage including a plurality of network entity definitions (NEDs) each defining a different network entity of a plurality of network entities that make up a target network architecture for the permissioned blockchain network. Each network entity of the plurality of network entities is one of an ordering service including a plurality of orderer nodes and an ordering membership service provider configured to verify that signatures were generated by a valid cryptographic identity and issued by the ordering service, one of a plurality of organizations, each organization of the plurality of organizations including a plurality of peer nodes and an organizational membership service provider configured to verify that signatures were generated by a valid cryptographic identity within the organization and issued by the organization. The method also includes establishing the plurality of organizations of the permissioned blockchain network using the plurality of NEDs by, for each organization of the plurality of organizations, instantiating the organizational membership service provider as defined by the NED for the organization. The plurality of organizations also includes, for each peer node of the plurality of peer nodes belonging to the organization as defined by the NED, registering the peer node with the organizational membership service provider of the organization by providing identifying information specified in the NED for the peer node to the organizational membership service provider, enrolling the peer node by generating a cryptographic identity for the peer node using the organizational membership service provider, and storing the cryptographic identity generated for the peer node. Establishing the plurality of organizations also includes instantiating the plurality of peer nodes as defined by the NED. The method includes establishing the ordering service of the permissioned blockchain network by instantiating the ordering membership service provider as defined by the NED for the ordering service, and, for each orderer node of the plurality of orderer nodes belonging to the ordering service as defined by the NED, registering the orderer node with the ordering membership service provider by providing identifying information specified in the NED for the orderer node to the ordering membership service provider, enrolling the orderer node by generating a cryptographic identity for the orderer node using the ordering membership service provider, and storing the cryptographic identity generated for the orderer node. Finally, the method also includes [instantiating the plurality of orderer nodes as defined by the NED.

Particular embodiments may comprise one or more of the following features. At least one of the NEDs describing one of the plurality of organizations may include at least one smart contract defined for that organization. Instantiating the plurality of peer nodes for that organization may include distributing the at least one smart contract to the plurality of peer nodes. The method may further include establishing a plurality of channels, each channel including the BNC system and at least one network entity. Each NED of the plurality of NEDs may define channel membership for the network entity defined by the NED. The BNC system may monitor each channel and may maintain the target network architecture for each channel. Storing the cryptographic identities generated for the peer nodes and orderer nodes may include sending each cryptographic identity to a cloud storage communicatively coupled to the BNC system through a physical network, and/or storing, for each cryptographic identity stored in the cloud storage, cryptographic material allowing access to the cryptographic identity in the cloud storage. The cryptographic material may be stored in the NED associated with the cryptographic identity. Instantiating the plurality of peer nodes may further include each peer node of the plurality of peer nodes retrieving its cryptographic identity from the cloud storage using the cryptographic material stored in the associated NED. Instantiating the plurality of orderer nodes may further include each orderer node of the plurality of orderer nodes retrieving its cryptographic identity from the cloud storage using the cryptographic material stored in the associated NED. Each ordering membership service provider and/or each organizational membership service provider may include a root certificate authority node and/or an intermediate certificate authority node. The method may further include instantiating at least one of additional peer nodes and additional orderer nodes in response to an increase in demand for at least one the ordering service and at least one of the plurality of organization. At least one NED may define a portion of the target network architecture as having an unbounded number of nodes. The method may further include comparing the permissioned blockchain network with the target network architecture as defined by the plurality of NEDs, and/or destroying at least a portion of the permissioned blockchain network in response to detecting a deviation between the at least a portion of the permissioned blockchain network and the target network architecture. The method may also include regenerating the permissioned blockchain network by instantiating the portion of the target network architecture that was destroyed, using at least one NED describing the destroyed portion, thereby reconciling the permissioned blockchain network with the target network architecture.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The disclosure will hereinafter be described in conjunction with the appended drawings, where like designations denote like elements, and.

DETAILED DESCRIPTION

Figure 1:
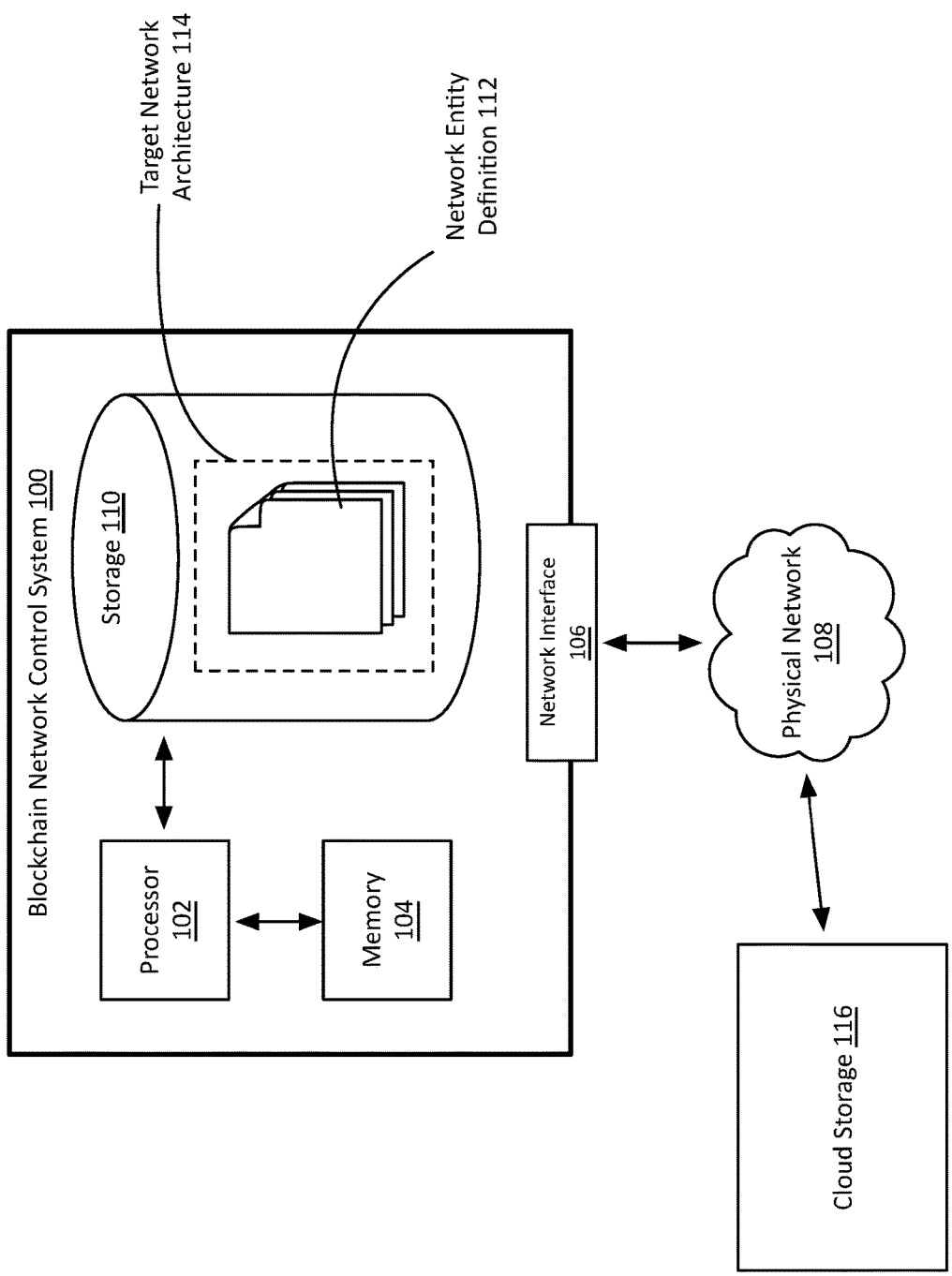
FIG. 1 is a network view of a blockchain network control system.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

Many industries, such as healthcare, are built upon many different sub-industries that must all work together, despite sometimes having divergent business interests. The use of permissioned blockchain networks allows different parties to interact, share information, and even automate inter-party processes while relying on an immutable transaction ledger to keep everyone honest. However, permissioned blockchain networks require a great deal of careful configuration to set up and maintain. In particular, configuring containers such as Kubernetes objects, installing smart contracts, establishing permissions, authenticated identities, and certificates, as well as the network objects needed to verify and maintain the blockchain network, can be delicate and time consuming. Establishing and maintaining a permissioned blockchain network may be further complicated in dynamic networks having a population of network objects that can grow and shrink depending on the demands being placed on the network.

In the context of the present description and the claims that follow, a network object is a fundamental unit within a blockchain network able to perform actions such as execute chaincode, sign transactions, and the like. Examples include, but are not limited to, nodes such as peer nodes, orderers, and so forth.

Contemplated herein is a blockchain network control system (hereinafter "BNC system") and method configured to establish and maintain a permissioned blockchain network. According to various embodiments, the BNC system may be configured to create a permissioned blockchain network having a desired or target architecture. Once configured, the BNC system can automatically stand up the network and then monitor it for deviations from that desired architecture, such as the addition of a rogue organization. The BNC system can, upon detection, remove these deviations from the desired architecture and return the blockchain network to a preferred state. Furthermore, in some embodiments, the BNC system may maintain this target architecture while also allowing the blockchain network to grow or shrink to match demand. The BNC system allows for easier and faster configuration of a permissioned blockchain network, and reduces the amount of redundant work that occurs during the manual configuration of such a network. The BNC system streamlines this process enough that simply destroying a portion of the blockchain network that is deviating from the desired architecture and then regenerating it is a solution that would not be practical using conventional methods and systems.

In the context of the present description and the claims that follow, a permissioned blockchain network is a blockchain network that does not accept transactions from network objects or nodes that do not possess valid cryptographic identities issued by an approved member of the network. This is different from open, permission-less blockchain networks that allow unknown identities to participate, requiring protocols like "proof of work" to validate transactions and secure the network. A non-limiting example of a permissioned blockchain network is a Hyperledger Fabric network. Some of the embodiments contemplated herein will be discussed in the context of certain features of Hyperledger Fabric networks, such as the use of channels. Those skilled in the art will recognize that the system and method contemplated herein may be applied to other permissioned blockchain networks.

FIG. 1 is a network view of a non-limiting example of a blockchain network control system 100 (hereinafter BNC system 100 or system 100). As shown, the BNC system 100 comprises a processor 102 communicatively coupled to a memory 104 and a network interface 106, the network interface 106 communicatively coupled to a physical network 108. According to various embodiments, the BNC system 100 is configured to create and maintain a permissioned or authenticated blockchain network having a target network architecture 114 that has been defined through a series of network entity definitions 112.

As shown, the processor 102 is also communicatively coupled to a storage 110, which contains a plurality of network entity definitions 112 (hereinafter NEDs 112) that together define a target network architecture 114. In the context of the present description and the claims that follow, a target network architecture 114 describes at least two core aspects of a permissioned blockchain network: an ordering service, and one or more organizations. These two aspects, and how the BNC system 100 creates and maintains them, will be discussed in greater detail, below. In some embodiments, the target network architecture 114 may also define channels, or subsets of the network isolated from the rest, allowing private communications recorded in a separate blockchain ledger. Channels will be discussed in greater detail with respect to FIG. 4, below.

In the context of the present description and the claims that follow, a network entity definition 112 is a file or data object that specifies the structural details of a specific blockchain network entity, such as an organization. The BNC system 100 uses NEDs 112 to define a target network architecture 114, reads the NEDs 112, instantiates the blockchain network by standing up the various objects defined by the NEDs 112, and then maintains the blockchain network, removing much of the painstaking manual work conventional blockchain networking methods and technologies require.

The BNC system 100 may be implemented in a variety of hardware and/or execution environments. As shown, the BNC system 100 comprises a processor 102 communicatively coupled to a memory 104, a storage 110, and a network interface 106. In some embodiments, the BNC system 100 maybe be implemented on a discrete computing device, such as a server. In other embodiments, the BNC system 100 may be implemented in a distributed computing environment, being spread across two or more computing device each having its own processor and memory. In still other embodiments, the BNC system 100 may be implemented in a virtualized or container-based environment, as is known in the art.

In some embodiments, the BNC system 100 may be communicatively coupled to a cloud storage 116 through the network interface 106, via a physical network 108 (e.g. the Internet, etc.). In the context of the present description and the claims that follow, a cloud storage 116 is a digital storage that is accessible over the physical network 108. The physical network 108 is referred to as a physical network to distinguish it from the permissioned blockchain network created and maintained by the BNC system, which may be hosted entirely on a single system. As will be discussed below, some embodiments may omit the cloud storage 116. For example, in some embodiments, the role of the cloud storage 116 may be filled by a storage local to the BNC system 100, or a storage device or system available on a local network.

Figure 2:
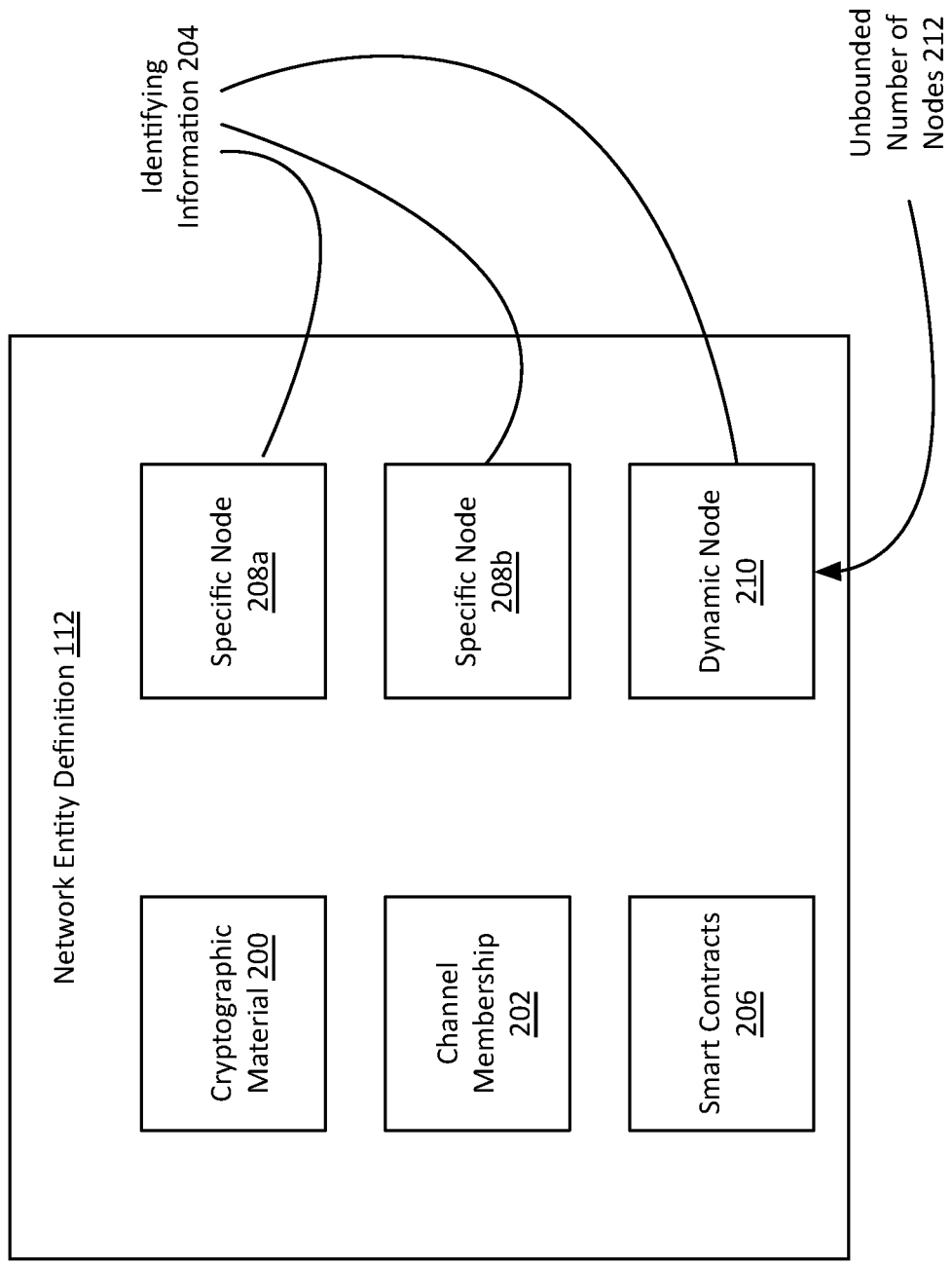
FIG. 2 is a schematic view of a network entity definition.

FIG. 2 is a schematic view of a non-limiting example of a network entity definition 112. As previously mentioned, NEDs 112 are used to define the network entities that make up a target network architecture 114. Network entities will be discussed further with respect to FIG. 3, below, but they may include organizations and ordering services. According to various embodiments, the NEDs 112 contain all of the information the BNC system 100 will need to stand up each entity, establish a permissioned blockchain network, and maintain the target network architecture 114. In some embodiments, each NED 112 may be a discrete file within a file system, while in other embodiments, it may be a data object, or a series of records within a database, or may exist in any other form or format known in the art. In some embodiments, a NED 112 may have a format or data serialization including, but not limited to, XML, JSON, YAML, and the like.

As shown, the NED 112 comprises identifying information 204 for each node that is part of the network entity defined by the NED 112. In the context of the present description and the claims that follow, identifying information 204 is any information that is needed to instantiate a node (e.g. peer, orderer, etc.) within a permissioned blockchain network. In some embodiment, the identifying information 204 does not include a cryptographic identity, which may be stored elsewhere (e.g. cloud storage 116, etc.). Examples of identifying information 204 include, but are not limited to, a node role (e.g. anchor, endorser, orderer, peer, etc.), a node name, addresses and networking parameters (e.g. address to the membership service provider, DNS server, etc.), execution environment information (e.g. endpoint for a virtual machine management system, container parameters), chaincode execution parameters (e.g. language, runtime location, logging level, etc.), ledger parameters (e.g. database type, database address, etc.), monitoring parameters (e.g. statsd server address, write intervals, etc.), and/or any other parameters known in the art to be necessary to stand up a node within a permissioned blockchain network.

In some embodiments, identifying information 204 may be segmented to define various nodes, including one or more specific nodes 208 and/or one or more dynamic nodes 210. In the context of the present description and the claims that follow, a specific node is a node that is unique among all the other nodes within the network entity being defined by the NED 112, while a dynamic node is a node that may have one or more functional duplicates within the network entity. A functional duplicate is able to perform all of the same functions, and have all of the same connections, while still having a unique identity. According to various embodiments, the specification of a dynamic node 210 within a NED 112 may allow an unbounded number 212 of said dynamic node 210 be instantiated. For example, in some embodiments, the target network architecture 114 stemming from a particular NED 112 may not be strictly defined (e.g. number of peers in an organization, number of orderers, etc.), but rather the NED 112 specifies the required permissions for each dynamic node 210, allowing for changes in the number of nodes in response to chain operation loads without being deemed a deviation from the target network architecture 114. In some embodiments, a dynamic node 210 may be defined within a NED 112 to have a bounded, though still dynamic, number of instances. In other embodiments, the NED 112 may not specify a limit to a dynamic node 210, which may be imposed by some other mechanism within the network entity or a manager entity (e.g. as part of load balancing, etc.).

As shown, in some embodiments, each NED 112 may comprise cryptographic material 200 that will permit access to cryptographic identities that are stored within the cloud storage 116. Cryptographic identities will be discussed in greater detail with respect to FIG. 3, but they are a key part of a permissioned blockchain network. Each authorized actor within the permissioned blockchain network will endorse transaction proposals and responses using their cryptographic identity, which can be verified to determine if the transaction is legitimate. Creating these identities for the various nodes within a network entity defined by the NED 112 and storing them, then providing the key or credentials needed to access them within the NED 112 is advantageous, as it allows the BNC system 100 to rapidly stand up a network entity, or regenerate it or part of it, if needed. The cryptographic material 200 may be any information that can be used to access information such as cryptographic identities within a storage, cloud or otherwise. Examples include, but are not limited to, credentials, private key, passwords, certificates, or any other cryptographic material 200 known in the art.

In some embodiments, the NED 112 may also define channel membership 202. According to various embodiments, a channel is a private blockchain network within a blockchain network, a subset of sorts, having its own ledger and world state. Channels allow for network entities within a permissioned blockchain network to communicate and interact with each other, and having those interactions remain hidden from other network entities. Channels will be discussed in greater detail with respect to FIGS. 3 and 4, below. According to various embodiments, a NED 112 may indicate which channels that network entity is a member of.

A number of parameters may be needed to configure a channel, including an access control list that associates resources (e.g. a smart contract that triggers an API, etc.) available through the channel with a policy. The policy may describe the attributes or identities of who can access it. In some embodiments, channel parameters may be indicated within the NEDs 112 of the various network entities that are members of that channel, while in other embodiments, the configuration parameters of a channel may be defined and stored in a separate NED 112 specific to the channel.

As shown, in some embodiments, a NED 112 may indicate one or more smart contracts 206 to be distributed to various indicated nodes within the network entity. In the context of the present description, a smart contract 206, or chaincode, is a series of logic operations or steps that represent a procedure being executed on behalf of an organization. According to various embodiments, smart contracts 206 identify what information is needed, where it needs to come from, what peers need to sign and/or how many peers need to sign, the criteria for rendering a decision, and any other evaluation or function that may be involved in automating a particular procedure, evaluation, or transaction. In some embodiments, one or more smart contracts 206 may be defined within the NED 112 (e.g. the NED 112 may include the actual code of the smart contract 206, etc.). In other embodiments, the smart contracts 206 may be obtained by the BNC system 100 from another source (e.g. storage 110, cloud storage 116, external server associated with the party represented by the organization defined by the NED 112, etc.) during the spin up of an organization within the permissioned blockchain network. After the appropriate peer node(s) have been instantiated, the BNC system 100 may distribute the smart contract(s) 206.

Figure 3:
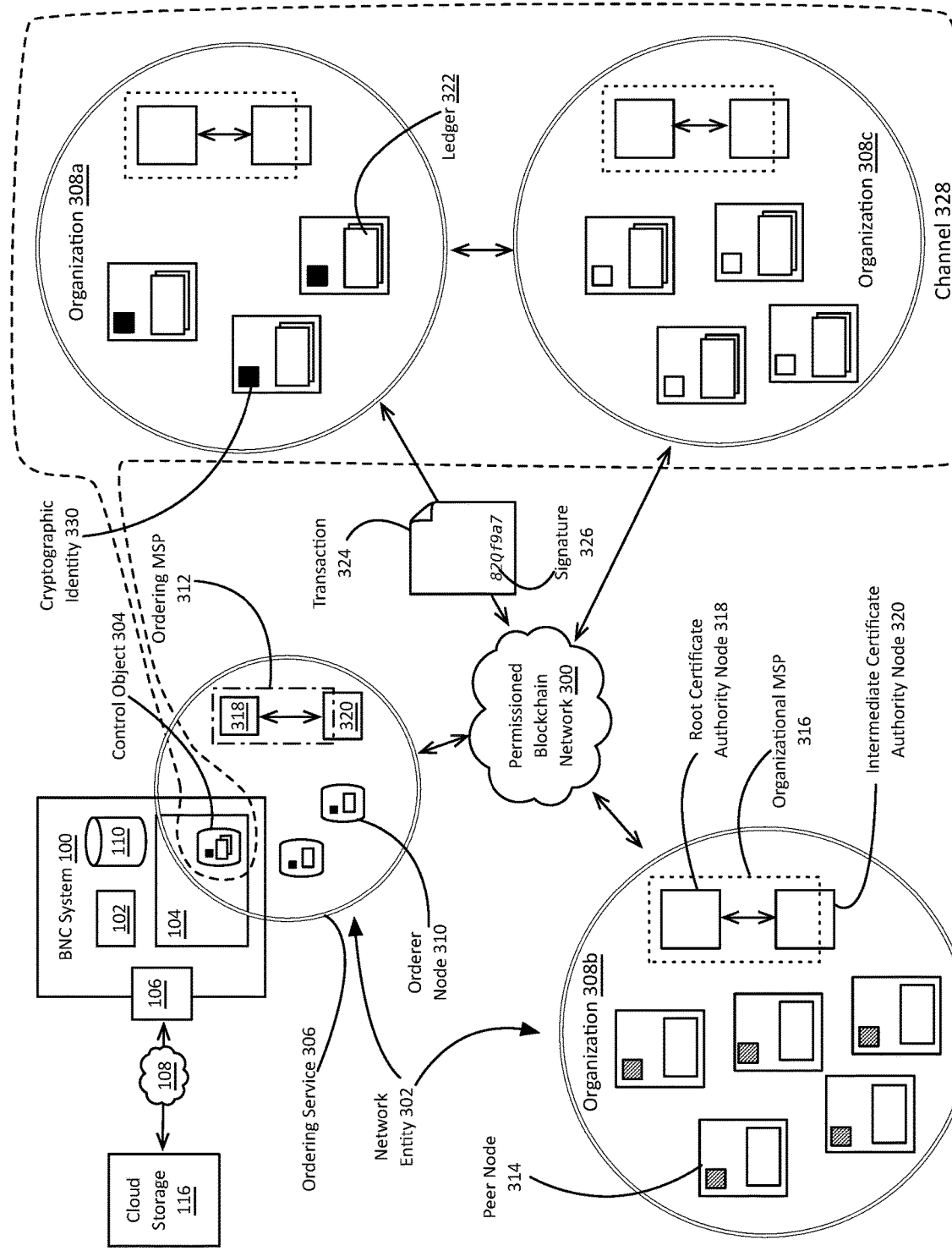
FIG. 3 is a schematic view of a blockchain network control system within a permissioned blockchain network.

FIG. 3 is a schematic view of a non-limiting example of a blockchain network control system 100 operating within a permissioned blockchain network 300 it has created. Specifically, FIG. 3 shows the BNC system 100 coupled to a permissioned blockchain network 300 made up of four network entities 302 (represented as circles), three organizations 308a-308c and an ordering service 306. It should be noted that, while the non-limiting example of a BNC system 100 shown in FIG. 3 is described as being coupled to a permissioned blockchain network 300 it has created, in other embodiments, the BNC system 100 may be used within a permissioned blockchain network 300 that was created through some other method or system. For example, the BNC system 100 may be used to maintain an existing permissioned blockchain network 300, in one embodiment.

The permissioned blockchain network 300 shown in FIG. 3 matches the target network architecture 114 of FIG. 1, which comprises a plurality of NEDs 112, each defining the permissions, structure, and connectivity of a network entity 302, according to various embodiments. In the context of the present description and the claims that follow, a network entity 302 is a collection of nodes that are operating together on behalf of a party (e.g. an individual, a corporation, an institution, etc.), representing their interests within the permissioned blockchain network 300, making resources available to other members of the blockchain network, and making use of the resources they provide. FIG. 3 shows two examples of network entities 302, organizations 308 and an ordering service 306. According to various embodiments, the BNC system 100 stands up and manages these two core types of network entities 302; however, this does not preclude the presence or even instantiation and/or management of other types of network entities 302 by the BNC system 100, according to various embodiments.

As shown, each organization 308 of the three organizations 308a-308c of FIG. 3 comprises a plurality of peer nodes 314. In the context of the present description and the claims that follow, an organization 308 is the representation of a party within the permissioned blockchain network 300; the party is able to make use of resources provided on the blockchain network (e.g. smart contracts linked to APIs, data stores, etc.), as well as make resources available. The party being represented may be as large as a multinational corporation or as small as a single individual. Each organization 308 also comprises an organizational membership service provider 316, which will be discussed in greater detail, below.

Each organization 308 comprises a plurality of peer nodes 314. It is through these peer nodes 314 that an organization 308 is able to interact with the rest of the permissioned blockchain network 300. In the context of the present description and the claims that follow, a peer node 314 is a network object that maintains a copy of the blockchain ledger 322, and is able to execute chaincode or smart contracts 206, access ledger 322 data, endorse transactions 324, and otherwise interface with other organizations 308, applications, and/or resources on the permissioned blockchain network 300.

The permissioned blockchain network also comprises an ordering service 306. In the context of the present description and the claims that follow, an ordering service 306 is responsible for the actual operation of the permissioned blockchain network 300. As shown, the ordering service 306 comprises one or more orderer nodes 310 (or orderers 310). According to various embodiments, an orderer node 310 is a network object within an ordering service 306 that ensures that the blockchain is consistent by making sure all proposed transactions 324 are valid and have been signed by all required organizations 308 (e.g. as required by an endorsing policy, etc.). Orderer nodes 310 also are responsible for delivering endorsed blockchain transactions 324 to the peers 314 in the permissioned blockchain network 300, making sure the ledger 322 is maintained and consistent throughout the permissioned blockchain network 300. Each orderer 310 and peer 314 maintains a copy of the ledger 322 and a world state, as is known in the art. It should be noted that, while the world state is not shown in any of the figures, depictions and references to a ledger 322 implies the presence of an accompanying world state, as is known in the art.

As shown, the ordering service 306 also comprises an ordering membership service provider 312. In the context of the present description and the claims that follow, an ordering membership service provider 312 is a membership service provider for the ordering service 306, and the organizational membership service provider 316 is a membership service provider for an organization 308. As shown, in some embodiments, each network entity 302 may have its own membership service provider. In other embodiments, one or more network entities 302 may share a membership service provider.

In the context of the present description and the claims that follow, a membership service provider is a component of the blockchain network that provides and authenticates cryptographic identities 330 (e.g. credentials, etc.) to peer nodes 314, orderer nodes 310, and/or other actors within the network 300, for them to participate in the permissioned blockchain network 300. More specifically, an organizational membership service provider 316 is configured to verify that signatures 326 were generated by a valid cryptographic identity 330 within the organization 308 and issued on behalf of the organization 308, and an ordering membership service provider 312 is configured to verify that signatures 326 were generated by a valid cryptographic identity 330 issued on behalf of the ordering service 306. Within the permissioned permissioned blockchain network 300, operations are only accepted from valid, identified nodes with the proper permissions. In some embodiments, the membership service providers issue cryptographic identities 330 and verify that signatures 326 or endorsements (such as those on transactions 324) were generated by a valid identity, and issued on behalf of that network entity 302.

According to various embodiments, these membership service providers may be based on a public key infrastructure, or any other authentication technology or method known in the art. As shown in FIG. 3, in some embodiments, ordering membership service provider 312 and each organizational membership service provider 316 may comprise a root certificate authority node 318 and an intermediate certificate authority node 320. As a specific example, in some embodiments, these certificate-based membership service providers may issue a cryptographic identity 330 encapsulated in an X.509 digital certificate. In some embodiments, only the intermediate certificate authority node 320 may be exposed, and only the intermediate certificate authority node 320 has access to the root certificate authority node 318, further enhancing security and trustworthiness of the issued identities 330.

As previously mentioned, the BNC system 100 creates the permissioned blockchain network 300, and maintains it. The BNC system 100 is able to do so by participating in the blockchain network. For example, as shown in FIG. 3, in some embodiments, the BNC system 100 may host at least one control object 304 instantiated within the permissioned blockchain network 300, and through which the BNC system 100 is able to communicate with the other network entities 304, monitor, and maintain the network 300.

In the context of the present description and the claims that follow, a control object 304 instantiated in blockchain is a node, such as an orderer node 310 of the ordering service 306 or a peer node 314 of an organization 308, that is hosted in such a way that the BNC system 100 has control over it (e.g. on the same hardware as the BNC system 100, in the same virtualized environment as the BNC system 100, etc.). It should be noted that in some embodiments, the entire permissioned blockchain network 300 could be hosted on hardware operated and maintained by the party that controls the BNC system 100, keeping the various aspects of the network 300 and the participating parties partitioned from each other, per established policies. In other embodiments, the permissioned blockchain network 300 could comprise nodes hosted on different computing devices spread around the world, under the control of a variety of parties.

Ensuring that the BNC system 100 is able to interact with at least one control object 304 means the target network architecture 114 may be established and maintained, even when the actual hosting or computing environment is outside of the BNC systems 100 direct control. As will be discussed further in the context of FIG. 5, below, storing the various cryptographic identities 330 in a cloud storage 116 is advantageous in permissioned blockchain networks 300 hosted in an uncertain environment (e.g. the entire network is not hosted alongside the BNC system 100, organizations 308 may join that are hosted in remote systems, etc.).

As shown, the permissioned blockchain network 300 established by the BNC system 100 may comprise one or more channels 328. In the context of the present description and the claims that follow, a channel 328 is a private blockchain overlay which allows for data isolation and confidentiality among the network entities 302 that are members of the channel 328. Each channel 328 functions as a sub-network of the permissioned blockchain network 300, which itself may be thought of as a universal channel. For example, a channel-specific ledger 322 is shared across the peers 314 in the channel 328, and transacting parties must be properly authenticated to a channel 328 in order to interact with it. For example, in FIG. 3, the control object 304 and each peer node 314 of organizations 308a and 308c have two ledgers 322, one for the entire network 300 and another for the channel 328.

In some embodiments, channels 328 may be established between organizations 308 that have long standing relationships, and that interact often. They are advantageous for the compartmentalization of sensitive data between relevant organizations 308 that would not be appropriate to share with the rest of the permissioned blockchain network 300.

According to various embodiments, each channel 328 established by the BNC system 100, or each channel 328 that is maintained by the BNC system 100, comprises at least one control object 304 of the BNC system 100, in addition to the member network entities 302. This allows the BNC system 100 to monitor and maintain each channel 328 without violating the privacy that necessitated the creation of the channel in the first place. As an option, each channel 328 may have its own target network architecture 114 defined in one or more NEDs 112.

It should be noted that the organizations 308 and the ordering service 306 are represented as collections of nodes, rather than depicting the internal architecture. Those skilled in the art will recognize that the permissioned blockchain network 300 shown in FIG. 3 may comprise additional structural detail, such as one of the peers 314 operating as an anchor peer with the remaining peers 314 serving as endorsing peers 314, for each organization 308. In some embodiments, the intermediate certificate authority 320 stands between the rest of the nodes and the root certificate authority. These specific topologies may be specified in the target network architecture 114, in the individual NEDs 112, according to various embodiments.

In some embodiments, the network objects within the permissioned blockchain network 300 (e.g. peers 314, orderers 310, certificate authorities, etc.) may each be a physical device. In other embodiments, some or all of these objects may be ephemeral; virtualized on one or more computing platforms, and operating as independent devices. In one embodiment, the BNC system 100 and the permissioned blockchain network 300 it creates and manages may exist as collection of containers. In another embodiment, the network objects may be pods (e.g. groups of containers with shared storage and networking operating together).

In some embodiments, the entities shown in FIG. 3 may be virtualized, yet spread physically across different devices or collections of devices (e.g. each organization 308 operates and maintains a computer cluster for hosting their peers 314 and certificate authorities, etc.), all communicatively coupled through the physical network 108. In other embodiments, the entities shown in FIG. 3 may all be containers hosted on hardware operated by a single party, providing each organization 308 access to the permissioned blockchain network 300, which may be provided in a SaaS context.

Figure 4:
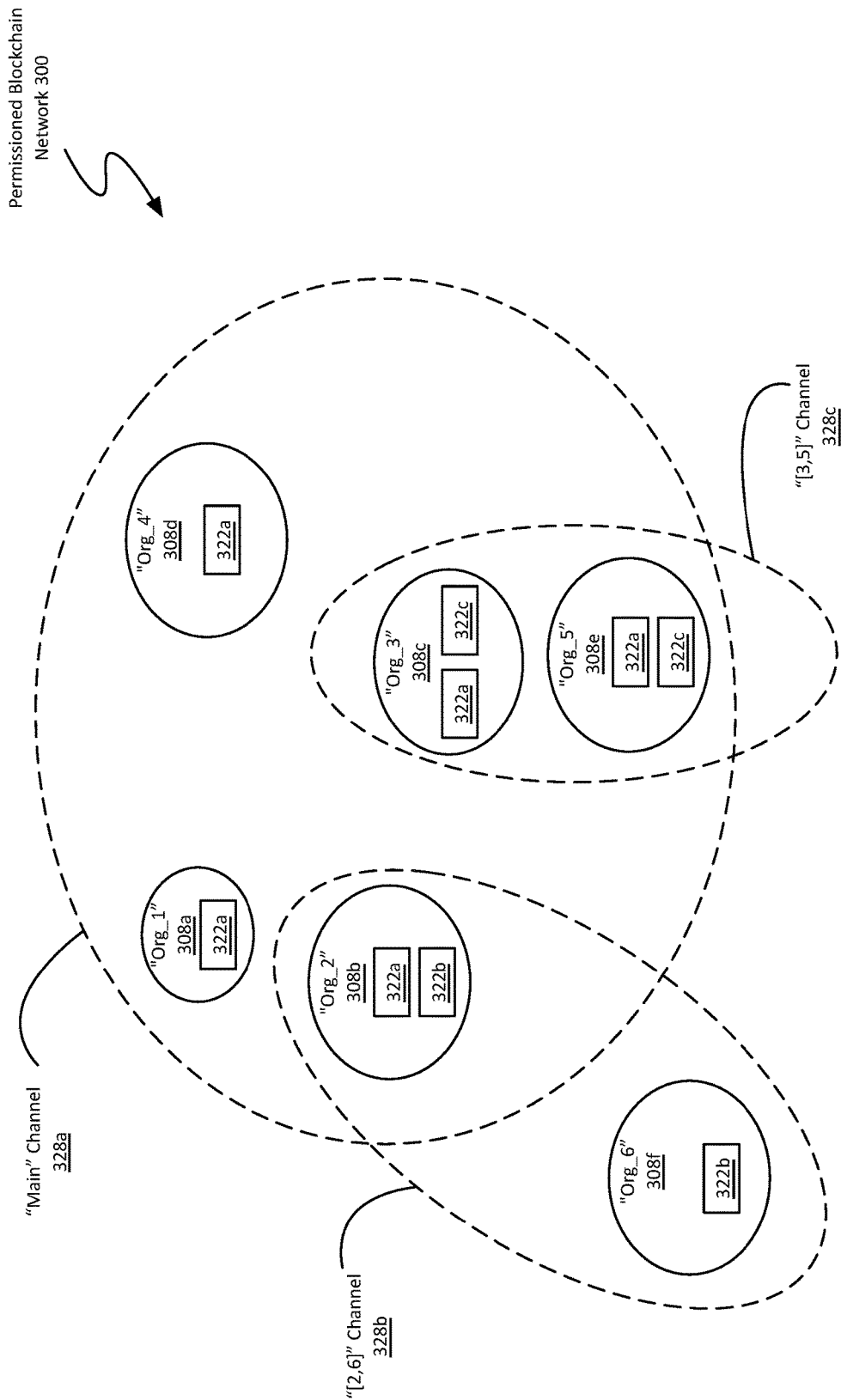
FIG. 4 is a schematic view of an exemplary permissioned blockchain network having channels.

FIG. 4 is a schematic view of a non-limiting example of a permissioned blockchain network 300 making use of multiple channels 328a-328c. Privacy and protection of data is of great importance in many industries, such as healthcare. The advantages that come from the use of an immutable ledger 322 must be balanced with the risks of exposing certain data to the wrong organizations 308.

FIG. 4 shows a non-limiting example of a permissioned blockchain network 300 made up of six organizations: Org_1 308a, Org_2 308b, Org_3 308c, Org_4 308d, Org_5 308e, and Org_6 308f. These six organizations are interacting through three different channels: main channel 328a, [2,6] channel 328b, and [3,5] channel 328c. Each organization 308 or, more specifically, the peers 314 of each organization 308, will maintain a world state and a ledger 322 for each channel 328 in which the organization 308 is participating.

As shown, organization Org_5 308e, being part of the main channel 328 as well as the [3,5] channel 328c, would have two sets of ledgers: a ledger 322a for 'main' and a ledger 322c for '[3,5]'. Organization Org_6 308f is not part of the main channel 328a, but does participate in a channel 328b with organization Org_2 308b, so it only has world state and a ledger 322b for channel 328b '[2,6]'. The main channel 328a, shared across many organizations, may have less sensitive information, while the smaller channels, such as the [3,5] channel 328c, may have private data that is critical to the operations of organizations Org_3 308c and Org_5 308e, but is both sensitive and not mission critical to the other organizations.

In some embodiments, the BNC system 100 may also create and maintain one or more channels 328, and join designated organizations 308 to the channels 328. The BNC system 100 may also instantiate smart contracts 206 within each channel 328, as appropriate. The BNC system 100 performs the same services within a channel 328 as it does for the permissioned blockchain network 300 as a whole, maintaining a desired architecture and fending off rogue actors. It should be noted that, though not shown, the BNC system 100 would be a member of all three channels shown in FIG. 3, allowing it to monitor and safeguard them all.

Figure 5:
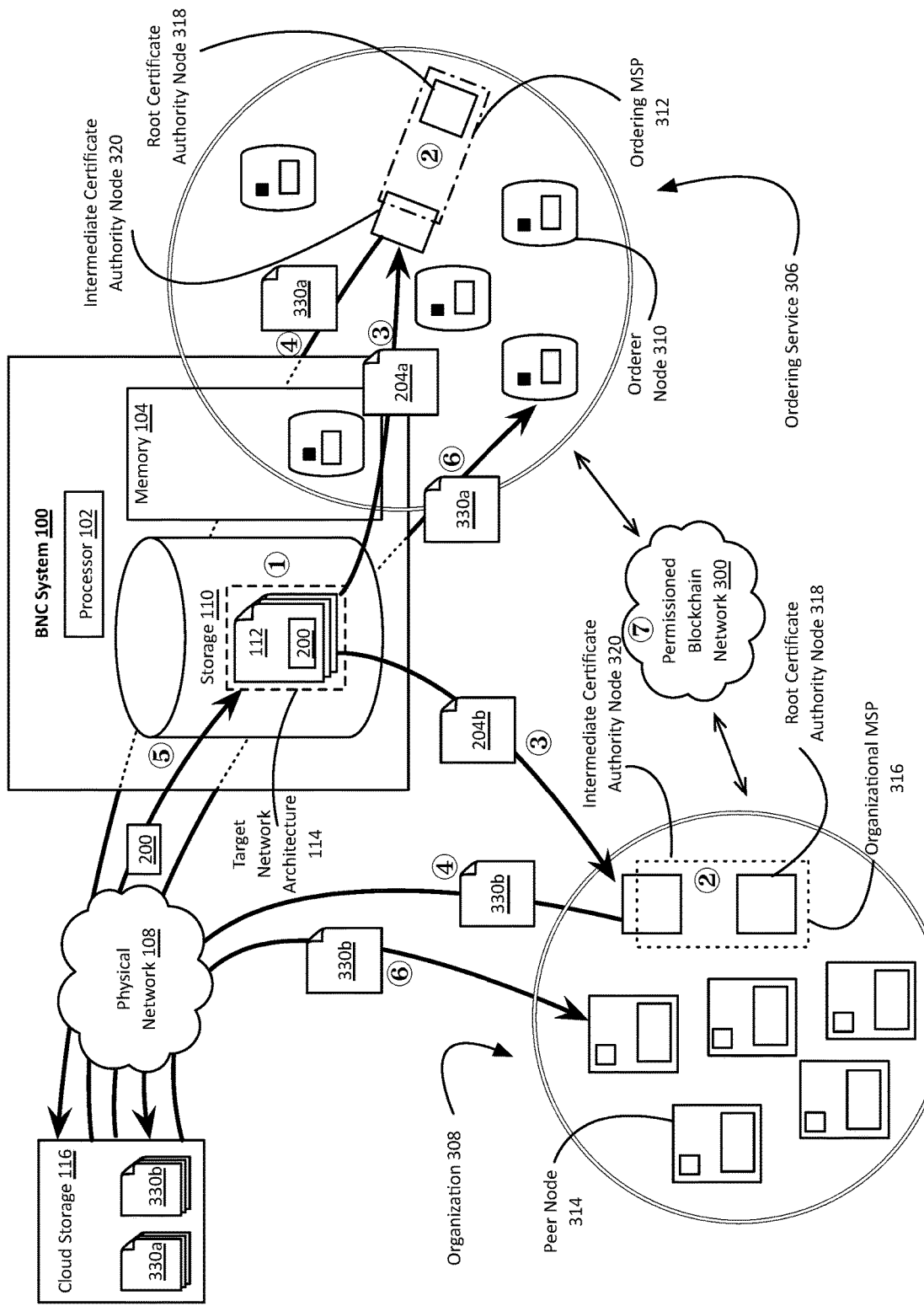
FIG. 5 is a process flow of a blockchain network control system instantiating a permissioned blockchain network.

FIG. 5 is a process flow of a non-limiting example of a blockchain network control system 100 instantiating a permissioned blockchain network 300. In this simplified example, the BNC system 100 is instantiating a permissioned blockchain network 300 that comprises a single organization 308 and an ordering service 306. However, before the blockchain network 300 can be instantiated, the target network architecture 114 must be defined.

According to various embodiments, the BNC system 100 creates a permissioned blockchain network 300 by first defining the network entities 302 that will participate, and the structure of the target network architecture 114 that they will form. The target network architecture 114 is defined through a plurality of network entity definitions 112, each specifying various parameters for a network entity 302 such as an organization 308 or an ordering service 306. See 'circle 1'. According to various embodiments, once defined, the NEDs 112 are stored in the storage 110 of the BNC system 100.

In some embodiments, the BNC system 100 may further include an interface to assist with the creation and configuration of the various NEDs 112. For example, in one embodiment, the BNC system 100 may have a collection of standardized NEDs 112 to serve as a starting point for the creation of a new permissioned blockchain network 300. In some embodiments, the BNC system 100 may comprise a plurality of default NEDs 112, whose values may be used by the BNC system 100 in the event that a parameter is not defined within a target network architecture 114 and is not addressed by the NEDs 112 defined for that architecture. This may facilitate the creation of new target architectures 114, as the NEDs 112 used would only need to specify the aspects that deviate from those established defaults held by the BNC system 100.

Once the target network architecture 114 has been established and the NEDs 112 defined and stored within the storage 110, the permissioned blockchain network 300 is ready to be instantiated. First, the BNC system 100 stands up the various membership service providers for the network entities 302. Specifically, the BNC system 100 stands up, or executes within a computing environment, one or more organizational membership service providers 316, and an ordering membership service provider 312. See 'circle 2'. According to various embodiments, the ordering membership service provider 312 may be stood up first.

In some embodiments, these membership service providers may comprise certificate authorities, such as a root certificate authority, an intermediate certificate authority 320, and the like. As a specific example, one embodiment where the membership service providers each have a root certificate authority and an intermediate certificate authority may stand up the root certificate authority first, followed by the intermediate certificate authority, which is subsequently used to enroll and register other network objects. Other embodiments may utilize other types of membership service providers, as known in the art.

Once a membership service provider is up and running, the cryptographic identities 330 of the remaining network objects of the network entity 302 served by that membership service provider may then be prepared. According to various embodiments, the cryptographic identities 330 are prepared through a process of registration and enrollment. See 'circle 3'. It should be noted that registration and enrollment is the process employed by some embodiments utilizing certificate authorities, such as the non-limiting example shown in FIG. 5. In other embodiments making use of different membership service providers, different processes for preparing cryptographic identities 330 may be employed.

The various nodes (e.g. peer node 314, orderer node 310, etc.) are each registered with their membership service provider (e.g. organizational membership service provider 316, ordering membership service provider 312, etc.) by providing identifying information 204 specified in the NED 112 for that node. In the context of the present description and the claims that follow, a membership service provider "belongs" to a node (meaning it is "their" MSP) when it belongs to the same network entity 302 as that node.

According to various embodiments, after the identifying information for the node is established with the appropriate membership service provider, the membership service provider issues an enrollment ID and secret, which may be used to enroll and receive a certificate, as is known in the art. In some embodiments, this enrollment ID and secret may be stored in the NED 112 for that node, to be used upon instantiation to request that node's cryptographic identity 330 (i.e. certificate) from the membership service provider.

In other embodiments, including the non-limiting example shown in FIG. 5, the BNC system 100 immediately submits (e.g. executes an enroll command with the certificate authority, etc.) the enrollment authentication information (e.g. enrollment ID, secret, etc.) to the appropriate membership service provider, which then generates that node's cryptographic identity 330. The BNC system 100 then receives that cryptographic identity 330 on behalf of the node, which has yet to be instantiated. According to various embodiments, each cryptographic identity 330 is a public/private key pair containing the role and attributes assigned by the membership service provider, based on the identifying information 204 provided from the NED 112.

In some embodiments, the cryptographic identity 330 is generated and retrieved for each node in sequence. In other embodiments, the generation of the cryptographic identities 330 may be performed in parallel, the membership service provider (e.g. organizational membership service provider 316, etc.) of each network entity 302 generating the identities 330 for that entity's nodes in parallel. In some embodiments, the generation of these cryptographic identities 330 may begin as soon as the appropriate membership service provider has been stood up, while in other embodiments, all MSPs may be stood up before the identities 330 are generated.

In some embodiments, the various membership service providers may generate a single cryptographic identity 330 for each network object, to be used to endorse transaction proposals and responses. In other embodiments, multiple cryptographic identities 330 may be generated for some, or all, of these network objects. For example, in one embodiment, a first cryptographic identity 330a may be generated for a node to be used in signing transactions within the permissioned blockchain network, and a second cryptographic identity 330b may be generated for use in the actual network communications.

As a specific example, the second cryptographic identity 330b may be used with the transport layer security (TLS) protocol which secures the network communications by encrypting the data being transmitted, as is known in the art. In some embodiments, the second (or subsequent) cryptographic identities 330 may be provided by the same certificate authorities (or other MSPs) that generated the first cryptographic identity 330 (i.e. identity used for signing blockchain transactions). In other embodiments, a separate certificate authority, or certificate authority node, may be established specifically for the generation and verification of the certificates used for the TLS protocol, to avoid bottlenecks.

After the BNC system 100 has received the cryptographic identities 330 generated by the various membership service providers, they are each sent to a cloud storage 116 that is communicatively coupled to the BNC system 100 through the physical network 108. See 'circle 4'. Specifically, for each peer node 314 and each orderer node 310, the generated cryptographic identity 330 is stored in the cloud storage 116. In some embodiments, the identities 330 are sent directly from each membership service provider, as they are generated. In other embodiments, the membership service providers may be insulated from direct interaction with the physical network 108 for security reasons, and the cryptographic identities 330 may be sent to the cloud storage 116 by way of the BNC system 100 or, more specifically, the network interface 106 of the BNC system 100. In other embodiments, the cryptographic identities 330 may be stored in the storage 110 of the BNC system 100. For example, each cryptographic identity 330 may be stored within, or stored separate from and referenced in, the NED 112 for the network entity 302 of that particular network object.

According to various embodiments, the storage of the cryptographic identities 330 in the cloud storage 116 may be compartmentalized, such that access to the identities may be granted on a per-node or per-network entity basis. The storage of a cryptographic identity 330 within the cloud storage 116 results in the creation of cryptographic material 200 (e.g. public/private key, authentication key, etc.) that allows access to that cryptographic identity 330 within the cloud storage 116, or is used for determining access permissions within the cloud storage provider's services, as is known in the art. For each network object (e.g. peer node 314, orderer node 310, etc.), the cryptographic material 200 allowing access to the cryptographic identity 330 for that object, stored in the cloud storage 116, is stored in the NED 112 associated with that cryptographic identity 330 (i.e. the NED 112 for the node that was issued that cryptographic identity 330). See 'circle 5'. In other embodiments, a link or reference pointing to the cryptographic identity 330 within storage 110 may be stored in each NED 112.

Once the BNC system 100 has verified that all identities 330 have been securely stored, and the cryptographic material 200 pertaining to accessing these identities 330 within the cloud storage 116 has been generated and stored within the appropriate NEDs 112, the BNC system 100 may begin instantiating the various peer nodes 314 and orderer nodes 310 for the various network entities, as defined by the NEDs 112.

In some embodiments, the orderer 310 may be stood up first, to assist with the distribution of the ledger and world state to all of the new peer nodes 314 coming online. In one embodiment, upon instantiation of the first orderer node 310, a global or genesis block may be created to initialize the ledger and world state, as is known in the art. For subsequent ordering nodes 310, as well as in cases where the BNC system 100 is standing up network objects within an already instantiated blockchain network 300, a reference to a block that has already been created may be provided.

According to various embodiments, each network object (e.g. peer nodes 314, orderers 310, etc.) retrieves its own cryptographic identity 330 from the cloud storage 116 using the cryptographic material 200 stored in the associated NED 112. See 'circle 6'. The storage of the cryptographic identities 330 in the cloud storage 116, distribution of cryptographic material 200 to the NEDs 112, and subsequent retrieval of the identities 330 by the instantiated network objects using the provided cryptographic material 200 is advantageous over conventional methods of establishing and distributing cryptographic identities 330 within a permissioned blockchain network 300. Having the cryptographic identities 330 already generated and available to the nodes allows for a large number of nodes to be quickly instantiated, or destroyed and reinstantiated, without creating a bottleneck at the membership service providers. As will be discussed with respect to FIG. 6, below, the BNC system 100 maintains the target network architecture through this process of reconciliation, according to various embodiments. Additionally, the storage of the identities 330 within a cloud accessible storage 116 increases their availability without requiring the necessary hardware redundancy within the computing environment of the BNC system 100.

As the various network objects (e.g. peer nodes 314, orderer nodes 310, etc.) are instantiated, they may be interconnected as defined within the NEDs 112 to form, or instantiate, a permissioned blockchain network 300. See 'circle 7'. Once all the nodes have been started and interconnected, the target network architecture 114 has been established. Once the BNC system 100 has established the target network architecture 114, it may then monitor and maintain it, as will be discussed with respect to FIG. 6, below.

One example of how the nodes may be interconnected, as defined in their NEDs 112, is the establishment of one or more channels 328, as discussed with respect to FIG. 4. Each channel 328 comprises an orderer 310 that determines what permissions, if any, a node sending a join request should be given within the channel, such as the ability to read and/or write information to the ledger that is confined to that channel 328. According to various embodiments, once an orderer 310 has been started, and it belongs to a channel 310 (per its NED 112), it may begin joining the peers 314 of various organizations 308 to that channel 328 as they send join requests. Other examples of the interconnections that may be defined within the NEDs 112 and established as part of instantiating the blockchain network 300 include, but are not limited to, the establishment of consortiums (i.e. predefined collections of organizations that can join channels together) and the definition of communication structures within a network entity 302.

As previously discussed, in some embodiments, the NEDs 112 may contain, or may reference, one or more smart contracts 206 or chaincode, which the BNC system 100 may install onto peer nodes 314 after they have been started. These smart contracts 206 may then be instantiated within one or more channels 328, operating as a resource that is shared among the authorized members of the channel 328, as is known in the art. In some embodiments, the instantiation of the permissioned blockchain network 300 may also comprise the instantiation of one or more endorsement policies within a channel 328, as is also known in the art. These endorsement policies may be defined within the NEDs 112 alongside the definition of the channel 328.

Figure 6:
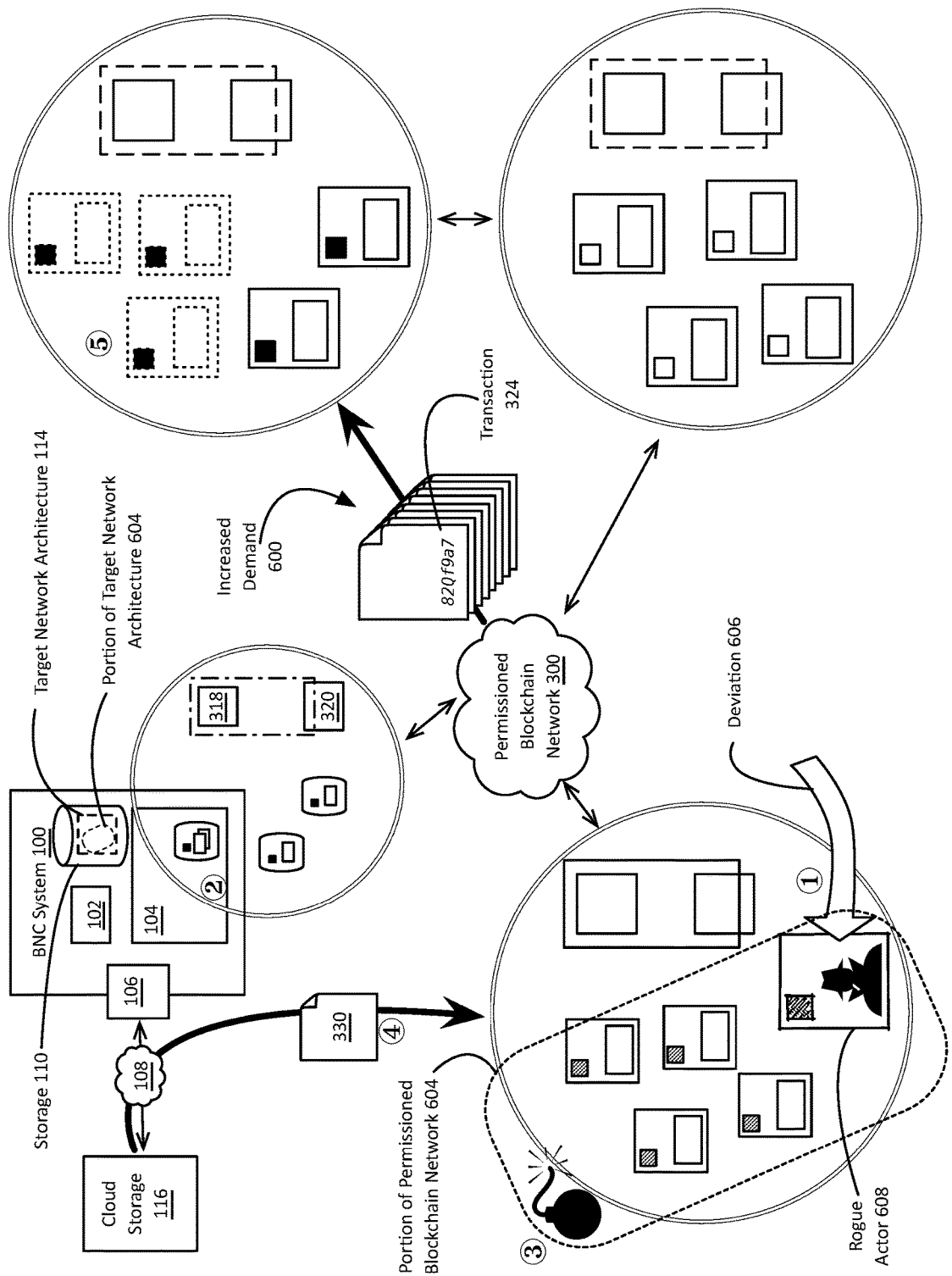
FIG. 6 is a process flow of a blockchain network control system maintaining a permissioned blockchain network.

FIG. 6 is a process flow of a non-limiting example of a blockchain network control system 100 maintaining a permissioned blockchain network 300. In addition to creating the permissioned blockchain network 300, the BNC system 100 also monitors and maintains the permissioned blockchain network 300. The BNC system 100 takes steps to ensure the target network architecture 114, defined by NEDs 112, is maintained, and pushes back against anything attempting to modify the permissioned blockchain network 300 away from that architecture. This process is called reconciliation, and comprises comparing the observed network with the ideal or intended network (i.e. target network architecture 114) as defined by the NEDs 112.

For example, if a rogue actor 608 (e.g. an unauthorized party, etc.) somehow gained access to the permissioned blockchain network 300 (see 'circle 1') and attempted to access the ledger 322 or insert transactions 324, the BNC system 100 observes that actor 608 (e.g. a false organization, an imitation peer, etc.) joining the permissioned blockchain network 300 and/or attempting to interact with the network 300. See 'circle 2'. According to various embodiments, the BNC system 100 may detect the presence or activity of a rogue actor 608 by comparing the actual network 300 with the target network architecture 114 (e.g. observing the different proposed transactions and comparing against the identities of network objects within the target architecture 114, polling the various network entities 302 for a node count, examining the ledger for illicit configuration blocks indicating the arrival of the rogue actor, etc.).

Upon detecting the deviation 606 from the target network architecture 114, the BNC system 100 responds to correct the deviation. In some embodiments, the BNC system 100 will destroy at least a portion 604 of the permissioned blockchain network 300 that contains the deviation 606, or may contain the deviation 606. See 'circle 3'. Using conventional systems and methods, it may be difficult to determine the exact nature of the deviation 606. For example, if a rogue actor 608 has inserted itself within an organization 308 it would be difficult to determine which network object within that network entity 302 does not belong, especially if the cryptographic identity 330 has been compromised. However, the systems and methods contemplated herein can not only detect the deviation 606 quickly, but also remove it. For example, in the case mentioned above, the most reliable way to remove the rogue actor may be to destroy part or all of that network entity 302. Such a response would not be practical using conventional methods; the BNC system 100 makes this a feasible response, as will be discussed below.

In other embodiments, the BNC system 100 may comprise an alert system, that notifies one or more parties (e.g. system operator, organization representatives, etc.) of the deviation 606 in the permissioned blockchain network 300. In still other embodiments, the BNC system 100 may forcibly remove the rogue actor 608 from the permissioned blockchain network 300, surgically (e.g. revoking certificates of the rogue actor 608, reissuing certificates for some or all of the blockchain network, etc.). However, as noted above, such a surgical response may not always be possible.

After the portion 604 of the permissioned blockchain network 300 has been destroyed (e.g. termination of network objects, revocation of cryptographic identities of those objects with other network entities 302 and/or channels 328, etc.), the BNC system 100 will regenerate the permissioned blockchain network 300 by instantiating the portion 602 of the target network architecture 114 that was destroyed, using at least one NED 112 describing the destroyed portion and the stored cryptographic identities 330 (if not compromised), thereby reconciling the permissioned blockchain network 300 with the target network architecture 114. See 'circle 4'. New or replacement peers 314 and/or orderers 310, once spun up, are able to pull down their identity from the cloud storage 116, and resume operating.

According to various embodiments, the orderers 310 and peers 314 may operate similar to load balancers. In some embodiments, the number of orderers 310 and/or peers 314 within an organization 308 may be modified by the BNC system 100, without changing the overall architecture or being considered a deviation 606 from the target network architecture 114. For example, if an increase in demand 600 results in a high volume of transactions 324 to an organization 308 are coming in, the BNC system 100 may instantiate additional peers 314 to handle those transactions 324. See 'circle 5'. The same may be done with orderers 310 for a high volume of transactions 324 network-wide that need to be ordered and added to the ledger 322. Once the increased demand has passed, the peers 314 and/or orderers 310 may be scaled back.

It should be noted that, in some embodiments, the target network architecture 114 is not strictly defined (e.g. number of peers 314 in an organization 308, number of orderers 310, etc.), but rather specifies the required permissions for each, allowing for changes in the number of peers 314 and orderers 310 in response to chain operation loads without being deemed a deviation from the target.

Figure 7:
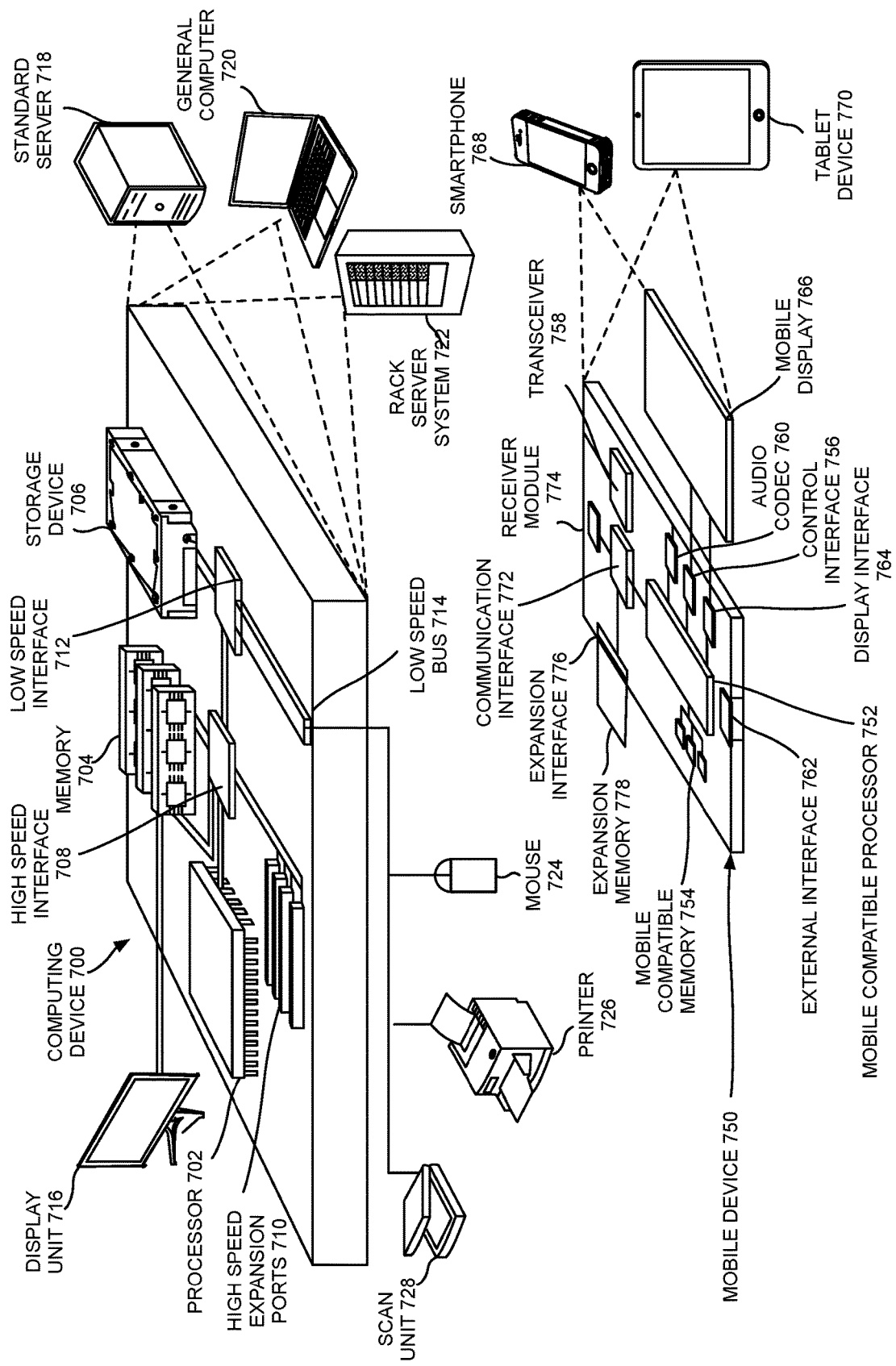
FIG. 7 is a schematic diagram of a specific computing device that can be used to implement the methods and systems disclosed herein, according to one or more embodiments.

FIG. 7 is a schematic diagram of specific computing device 700 and a specific mobile computing device 750 that can be used to perform and/or implement any of the embodiments disclosed herein. In one or more embodiments, BNC system 100 and/or cloud storage 116 of FIG. 1 may be the specific computing device 700.

The specific computing device 700 may represent various forms of digital computers, such as laptops, desktops, workstations, personal digital assistants, servers, blade servers, mainframes, and/or other appropriate computers. The specific mobile computing device 750 may represent various forms of mobile devices, such as smartphones, camera phones, personal digital assistants, cellular telephones, and other similar mobile devices. The components shown here, their connections, couples, and relationships, and their functions, are meant to be exemplary only, and are not meant to limit the embodiments described and/or claimed, according to one embodiment.

The specific computing device 700 may include a processor 702, a memory 704, a storage device 706, a high speed interface 708 coupled to the memory 704 and a plurality of high speed expansion ports 710, and a low speed interface 712 coupled to a low speed bus 714 and a storage device 706. In one embodiment, each of the components heretofore may be inter-coupled using various buses, and may be mounted on a common motherboard and/or in other manners as appropriate. The processor 702 may process instructions for execution in the specific computing device 700, including instructions stored in the memory 704 and/or on the storage device 706 to display a graphical information for a GUI on an external input/output device, such as a display unit 716 coupled to the high speed interface 708, according to one embodiment.

In other embodiments, multiple processors and/or multiple buses may be used, as appropriate, along with multiple memories and/or types of memory. Also, a plurality of specific computing device 700 may be coupled with, with each device providing portions of the necessary operations (e.g., as a server bank, a group of blade servers, and/or a multi-processor system).

The memory 704 may be coupled to the specific computing device 700. In one embodiment, the memory 704 may be a volatile memory. In another embodiment, the memory 704 may be a non-volatile memory. The memory 704 may also be another form of computer-readable medium, such as a magnetic and/or an optical disk. The storage device 706 may be capable of providing mass storage for the specific computing device 700. In one embodiment, the storage device 706 may be a floppy disk device, a hard disk device, an optical disk device, a tape device, a flash memory and/or other similar solid state memory device. In another embodiment, the storage device 706 may be an array of the devices in a computer-readable medium previously mentioned heretofore, computer-readable medium, such as, and/or an array of devices, including devices in a storage area network and/or other configurations.

A computer program may be comprised of instructions that, when executed, perform one or more methods, such as those described above. The instructions may be stored in the memory 704, the storage device 706, a memory coupled to the processor 702, and/or a propagated signal.

The high speed interface 708 may manage bandwidth-intensive operations for the specific computing device 700, while the low speed interface 712 may manage lower bandwidth-intensive operations. Such allocation of functions is exemplary only. In one embodiment, the high speed interface 708 may be coupled to the memory 704, the display unit 716 (e.g., through a graphics processor and/or an accelerator), and to the plurality of high speed expansion ports 710, which may accept various expansion cards.

In the embodiment, the low speed interface 712 may be coupled to the storage device 706 and the low speed bus 714. The low speed bus 714 may be comprised of a wired and/or wireless communication port (e.g., a Universal Serial Bus ("USB"), a Bluetooth® port, an Ethernet port, and/or a wireless Ethernet port). The low speed bus 714 may also be coupled to the scan unit 728, a printer 726, a keyboard, a mouse 724, and a networking device (e.g., a switch and/or a router) through a network adapter.

The specific computing device 700 may be implemented in a number of different forms, as shown in the figure. In one embodiment, the specific computing device 700 may be implemented as a standard server 718 and/or a group of such servers. In another embodiment, the specific computing device 700 may be implemented as part of a rack server system 722. In yet another embodiment, the specific computing device 700 may be implemented as a general computer 720 such as a laptop or desktop computer. Alternatively, a component from the specific computing device 700 may be combined with another component in a specific mobile computing device 750. In one or more embodiments, an entire system may be made up of a plurality of specific computing device 700 and/or a plurality of specific computing device 700 coupled to a plurality of specific mobile computing device 750.

In one embodiment, the specific mobile computing device 750 may include a mobile compatible processor 752, a mobile compatible memory 754, and an input/output device such as a mobile display 766, a communication interface 772, and a transceiver 758, among other components. The specific mobile computing device 750 may also be provided with a storage device, such as a microdrive or other device, to provide additional storage. In one embodiment, the components indicated heretofore are inter-coupled using various buses, and several of the components may be mounted on a common motherboard.

The mobile compatible processor 752 may execute instructions in the specific mobile computing device 750, including instructions stored in the mobile compatible memory 754. The mobile compatible processor 752 may be implemented as a chipset of chips that include separate and multiple analog and digital processors. The mobile compatible processor 752 may provide, for example, for coordination of the other components of the specific mobile computing device 750, such as control of user interfaces, applications run by the specific mobile computing device 750, and wireless communication by the specific mobile computing device 750.

The mobile compatible processor 752 may communicate with a user through the control interface 756 and the display interface 764 coupled to a mobile display 766. In one embodiment, the mobile display 766 may be a Thin-Film-Transistor Liquid Crystal Display ("TFT LCD"), an Organic Light Emitting Diode ("OLED") display, and another appropriate display technology. The display interface 764 may comprise appropriate circuitry for driving the mobile display 766 to present graphical and other information to a user. The control interface 756 may receive commands from a user and convert them for submission to the mobile compatible processor 752.

In addition, an external interface 762 may be in communication with the mobile compatible processor 752, so as to enable near area communication of the specific mobile computing device 750 with other devices. External interface 762 may provide, for example, for wired communication in some embodiments, or for wireless communication in other embodiments, and multiple interfaces may also be used.

The mobile compatible memory 754 may be coupled to the specific mobile computing device 750. The mobile compatible memory 754 may be implemented as a volatile memory and a non-volatile memory. The expansion memory 778 may also be coupled to the specific mobile computing device 750 through the expansion interface 776, which may comprise, for example, a Single In Line Memory Module ("SIMM") card interface. The expansion memory 778 may provide extra storage space for the specific mobile computing device 750, or may also store an application or other information for the specific mobile computing device 750.

Specifically, the expansion memory 778 may comprise instructions to carry out the processes described above. The expansion memory 778 may also comprise secure information. For example, the expansion memory 778 may be provided as a security module for the specific mobile computing device 750, and may be programmed with instructions that permit secure use of the specific mobile computing device 750. In addition, a secure application may be provided on the SIMM card, along with additional information, such as placing identifying information on the SIMM card in a non-hackable manner.

The mobile compatible memory may include a volatile memory (e.g., a flash memory) and a non-volatile memory (e.g., a non-volatile random-access memory ("NVRAM")). In one embodiment, a computer program comprises a set of instructions that, when executed, perform one or more methods. The set of instructions may be stored on the mobile compatible memory 754, the expansion memory 778, a memory coupled to the mobile compatible processor 752, and a propagated signal that may be received, for example, over the transceiver 758 and/or the external interface 762.

The specific mobile computing device 750 may communicate wirelessly through the communication interface 772, which may be comprised of a digital signal processing circuitry. The communication interface 772 may provide for communications using various modes and/or protocols, such as, a Global System for Mobile Communications ("GSM") protocol, a Short Message Service ("SMS") protocol, an Enhanced Messaging System ("EMS") protocol, a Multimedia Messaging Service ("MMS") protocol, a Code Division Multiple Access ("CDMA") protocol, Time Division Multiple Access ("TDMA") protocol, a Personal Digital Cellular ("PDC") protocol, a Wideband Code Division Multiple Access ("WCDMA") protocol, a CDMA2000 protocol, and a General Packet Radio Service ("GPRS") protocol.

Such communication may occur, for example, through the transceiver 758 (e.g., radio-frequency transceiver). In addition, short-range communication may occur, such as using a Bluetooth®, Wi-Fi, and/or other such transceiver. In addition, a GPS ("Global Positioning System") receiver module 774 may provide additional navigation-related and location-related wireless data to the specific mobile computing device 750, which may be used as appropriate by a software application running on the specific mobile computing device 750.

The specific mobile computing device 750 may also communicate audibly using an audio codec 760, which may receive spoken information from a user and convert it to usable digital information. The audio codec 760 may likewise generate audible sound for a user, such as through a speaker (e.g., in a handset smartphone of the specific mobile computing device 750). Such a sound may comprise a sound from a voice telephone call, a recorded sound (e.g., a voice message, a music files, etc.) and may also include a sound generated by an application operating on the specific mobile computing device 750.

The specific mobile computing device 750 may be implemented in a number of different forms, as shown in the figure. In one embodiment, the specific mobile computing device 750 may be implemented as a smartphone 768. In another embodiment, the specific mobile computing device 750 may be implemented as a personal digital assistant ("PDA"). In yet another embodiment, the specific mobile computing device, 750 may be implemented as a tablet device 770.

Various embodiments of the systems and techniques described here can be realized in a digital electronic circuitry, an integrated circuitry, a specially designed application specific integrated circuits ("ASICs"), a piece of computer hardware, a firmware, a software application, and a combination thereof. These various embodiments can include embodiment in one or more computer programs that are executable and/or interpretable on a programmable system including one programmable processor, which may be special or general purpose, coupled to receive data and instructions from, and to transmit data and instructions to, a storage system, one input device, and at least one output device.

These computer programs (also known as programs, software, software applications, and/or code) comprise machine-readable instructions for a programmable processor, and can be implemented in a high-level procedural and/or object-oriented programming language, and/or in assembly/machine language. As used herein, the terms "machine-readable medium" and/or "computer-readable medium" refers to any computer program product, apparatus and/or device (e.g., magnetic discs, optical disks, memory, and/or Programmable Logic Devices ("PLDs")) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computing device having a display device (e.g., a cathode ray tube ("CRT") and/or liquid crystal ("LCD") monitor) for displaying information to the user and a keyboard and a mouse by which the user can provide input to the computer. Other kinds of devices can be used to provide for interaction with a user as well; for example, feedback provided to the user can be any form of sensory feedback (e.g., visual feedback, auditory feedback, and/or tactile feedback) and input from the user can be received in any form, including acoustic, speech, and/or tactile input.

The systems and techniques described here may be implemented in a computing system that includes a back end component (e.g., as a data server), a middleware component (e.g., an application server), a front end component (e.g., a client computer having a graphical user interface, and/or a Web browser through which a user can interact with an embodiment of the systems and techniques described here), and a combination thereof. The components of the system may also be coupled through a communication network.

The communication network may include a local area network ("LAN") and a wide area network ("WAN") (e.g., the Internet). The computing system can include a client and a server. In one embodiment, the client and the server are remote from each other and interact through the communication network.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

Where the above examples, embodiments and implementations reference examples, it should be understood by those of ordinary skill in the art that other nodes, network entities, and membership service providers could be intermixed or substituted with those provided. In places where the description above refers to particular embodiments of blockchain network control systems and methods, it should be readily apparent that a number of modifications may be made without departing from the spirit thereof and that these embodiments and implementations may be applied to other blockchain network control systems and methods as well. Accordingly, the disclosed subject matter is intended to embrace all such alterations, modifications and variations that fall within the spirit and scope of the disclosure and the knowledge of one of ordinary skill in the art.

What is claimed is:

1. A blockchain network control system, comprising:
a processor communicatively coupled to a memory and a network interface, the network interface communicatively coupled to a physical network;
a storage communicatively coupled to the processor, the storage comprising a plurality of network entity definitions (NEDs) each defining a different network entity of a plurality of network entities that make up a target network architecture for a permissioned blockchain network, each network entity of the plurality of network entities being one of:
an ordering service comprising a plurality of orderer nodes and an ordering membership service provider configured to verify whether signatures on transactions within the permissioned blockchain network were generated by a valid cryptographic identity and issued by the ordering service; and
one of a plurality of organizations, each organization of the plurality of organizations comprising a plurality of peer nodes and an organizational membership service provider configured to verify whether signatures on transactions within the permissioned blockchain network were generated by a valid cryptographic identity within the organization and issued by the organization; and
at least one control object instantiated within the permissioned blockchain network and communicatively coupled, through the permissioned blockchain network, to an ordering service and a plurality of organizations;
wherein the plurality of organizations was established by the blockchain network control system using the plurality of NEDs by, for each organization of the plurality of organizations:
instantiating the organizational membership service provider as defined by the NED for the organization;
for each peer node of the plurality of peer nodes belonging to the organization as defined by the NED:
registering the peer node with the organizational membership service provider of the organization by providing identifying information specified in the NED for the peer node to the organizational membership service provider;
enrolling the peer node by generating a cryptographic identity for the peer node using the organizational membership service provider; and
storing the cryptographic identity generated for the peer node;
instantiating the plurality of peer nodes as defined by the NED;
wherein the ordering service of the permissioned blockchain network was established by the blockchain network control system by:
instantiating the ordering membership service provider as defined by the NED for the ordering service;
for each orderer node of the plurality of orderer nodes belonging to the ordering service as defined by the NED:
registering the orderer node with the ordering membership service provider by providing identifying information specified in the NED for the orderer node to the ordering membership service provider;
enrolling the orderer node by generating a cryptographic identity for the orderer node using the ordering membership service provider; and
storing the cryptographic identity generated for the orderer node; and
instantiating the plurality of orderer nodes as defined by the NED;
wherein the processor is configured to:
store the cryptographic identities generated for the peer nodes and orderer nodes by:
sending each cryptographic identity to a cloud storage communicatively coupled to the blockchain network control system through the physical network; and
storing, for each cryptographic identity stored in the cloud storage, cryptographic material allowing access to the cryptographic identity in the cloud storage, the cryptographic material being stored in the NED associated with the cryptographic identity;
compare the permissioned blockchain network with the target network architecture as defined by the plurality of NEDs;
destroy at least a portion of the permissioned blockchain network in response to detecting a deviation between the at least a portion of the permissioned blockchain network and the target network architecture; and
regenerate the permissioned blockchain network by instantiating the portion of the target network architecture that was destroyed, using at least one NED describing the destroyed portion, wherein regenerating the permissioned blockchain network reconciles the permissioned blockchain network with the target network architecture;
wherein each peer node of the plurality of peer nodes retrieves its own cryptographic identity from the cloud storage using the cryptographic material stored in the associated NED as part of being instantiated;
wherein each orderer node of the plurality of orderer nodes retrieves its own cryptographic identity from the cloud storage using the cryptographic material stored in the associated NED as part of being instantiated;
wherein, for at least one organization of the plurality of organizations of the permissioned blockchain network, the peer nodes comprise at least one smart contract that is distributed to the peer nodes by the blockchain network control system after each peer node is instantiated, and wherein the at least one smart contract is defined within the NED associated with each of the at least one organization; and
wherein each ordering membership service provider and each organizational membership service provider of the permissioned blockchain network comprises a root certificate authority node and an intermediate certificate authority node.

2. The system of claim 1:
wherein the permissioned blockchain network further comprises a plurality of channels established by the blockchain network control system, each channel comprising the at least one control object of the blockchain network control system and at least one network entity;
wherein each NED of the plurality of NEDs defines channel membership for the network entity defined by the NED; and
wherein the processor of the blockchain network control system is configured to monitor each channel and maintain the target network architecture for each channel.

3. The system of claim 1, wherein the processor is further configured to instantiate at least one of additional peer nodes and additional orderer nodes in response to an increase in demand for at least one the ordering service and at least one of the plurality of organization.

4. The system of claim 1, wherein at least one NED defines a portion of the target network architecture as having an unbounded number of nodes.

5. A blockchain network control system, comprising:
a processor communicatively coupled to a memory and a network interface, the network interface communicatively coupled to a physical network;
a storage communicatively coupled to the processor, the storage comprising a plurality of network entity definitions (NEDs) each defining a different network entity of a plurality of network entities that make up a target network architecture for a permissioned blockchain network, each network entity of the plurality of network entities being one of:
an ordering service comprising a plurality of orderer nodes and an ordering membership service provider configured to verify whether signatures on transactions within the permissioned blockchain network were generated by a valid cryptographic identity and issued by the ordering service; and
one of a plurality of organizations, each organization of the plurality of organizations comprising a plurality of peer nodes and an organizational membership service provider configured to verify whether signatures on transactions within the permissioned blockchain network were generated by a valid cryptographic identity within the organization and issued by the organization; and
at least one control object instantiated within the permissioned blockchain network and communicatively coupled, through the permissioned blockchain network, to an ordering service and a plurality of organizations;
wherein the plurality of organizations was established by the blockchain network control system using the plurality of NEDs by, for each organization of the plurality of organizations:
instantiating the organizational membership service provider as defined by the NED for the organization;
for each peer node of the plurality of peer nodes belonging to the organization as defined by the NED:
registering the peer node with the organizational membership service provider of the organization by providing identifying information specified in the NED for the peer node to the organizational membership service provider;
enrolling the peer node by generating a cryptographic identity for the peer node using the organizational membership service provider; and
storing the cryptographic identity generated for the peer node;
instantiating the plurality of peer nodes as defined by the NED;
wherein the ordering service of the permissioned blockchain network was established by the blockchain network control system by:
instantiating the ordering membership service provider as defined by the NED for the ordering service;
for each orderer node of the plurality of orderer nodes belonging to the ordering service as defined by the NED:
registering the orderer node with the ordering membership service provider by providing identifying information specified in the NED for the orderer node to the ordering membership service provider;
enrolling the orderer node by generating a cryptographic identity for the orderer node using the ordering membership service provider; and
storing the cryptographic identity generated for the orderer node; and
instantiating the plurality of orderer nodes as defined by the NED.

6. The system of claim 5 wherein, for at least one organization of the plurality of organizations of the permissioned blockchain network, the peer nodes comprise at least one smart contract that is distributed to the peer nodes by the blockchain network control system after each peer node is instantiated, and wherein the at least one smart contract is defined within the NED associated with each of the at least one organization.

7. The system of claim 5:
wherein the permissioned blockchain network further comprises a plurality of channels established by the blockchain network control system, each channel comprising the at least one control object of the blockchain network control system and at least one network entity;
wherein each NED of the plurality of NEDs defines channel membership for the network entity defined by the NED; and
wherein the processor of the blockchain network control system is configured to monitor each channel and maintain the target network architecture for each channel.

8. The system of claim 5, wherein the processor is further configured to:
store the cryptographic identities generated for the peer nodes and orderer nodes by:
sending each cryptographic identity to a cloud storage communicatively coupled to the blockchain network control system through the physical network; and
storing, for each cryptographic identity stored in the cloud storage, cryptographic material allowing access to the cryptographic identity in the cloud storage, the cryptographic material being stored in the NED associated with the cryptographic identity;
wherein each peer node of the plurality of peer nodes retrieves its own cryptographic identity from the cloud storage using the cryptographic material stored in the associated NED as part of being instantiated; and
wherein each orderer node of the plurality of orderer nodes retrieves its own cryptographic identity from the cloud storage using the cryptographic material stored in the associated NED as part of being instantiated.

9. The system of claim 5, wherein each ordering membership service provider and each organizational membership service provider of the permissioned blockchain network comprises a root certificate authority node and an intermediate certificate authority node.

10. The system of claim 5, wherein the processor is further configured to instantiate at least one of additional peer nodes and additional orderer nodes in response to an increase in demand for at least one the ordering service and at least one of the plurality of organization.

11. The system of claim 5, wherein at least one NED defines a portion of the target network architecture as having an unbounded number of nodes.

12. The system of claim 5, wherein the processor is further configured to:
compare the permissioned blockchain network with the target network architecture as defined by the plurality of NEDs;
destroy at least a portion of the permissioned blockchain network in response to detecting a deviation between the at least a portion of the permissioned blockchain network and the target network architecture; and
regenerate the permissioned blockchain network by instantiating the portion of the target network architecture that was destroyed, using at least one NED describing the destroyed portion, wherein regenerating the permissioned blockchain network reconciles the permissioned blockchain network with the target network architecture.

13. A method for controlling a permissioned blockchain network, comprising:
defining the permissioned blockchain network within a blockchain network control (BNC) system, the BNC system having a storage comprising a plurality of network entity definitions (NEDs) each defining a different network entity of a plurality of network entities that make up a target network architecture for the permissioned blockchain network, each network entity of the plurality of network entities being one of:
an ordering service comprising a plurality of orderer nodes and an ordering membership service provider configured to verify whether signatures on transactions within the permissioned blockchain network were generated by a valid cryptographic identity and issued by the ordering service; and
one of a plurality of organizations, each organization of the plurality of organizations comprising a plurality of peer nodes and an organizational membership service provider configured to verify whether signatures on transactions within the permissioned blockchain network were generated by a valid cryptographic identity within the organization and issued by the organization;
establishing the plurality of organizations of the permissioned blockchain network using the plurality of NEDs by, for each organization of the plurality of organizations:
instantiating the organizational membership service provider as defined by the NED for the organization;
for each peer node of the plurality of peer nodes belonging to the organization as defined by the NED:
registering the peer node with the organizational membership service provider of the organization by providing identifying information specified in the NED for the peer node to the organizational membership service provider;
enrolling the peer node by generating a cryptographic identity for the peer node using the organizational membership service provider; and
storing the cryptographic identity generated for the peer node;
instantiating the plurality of peer nodes as defined by the NED;
establishing the ordering service of the permissioned blockchain network by:
instantiating the ordering membership service provider as defined by the NED for the ordering service;
for each orderer node of the plurality of orderer nodes belonging to the ordering service as defined by the NED:
registering the orderer node with the ordering membership service provider by providing identifying information specified in the NED for the orderer node to the ordering membership service provider;
enrolling the orderer node by generating a cryptographic identity for the orderer node using the ordering membership service provider; and
storing the cryptographic identity generated for the orderer node; and
instantiating the plurality of orderer nodes as defined by the NED.

14. The method of claim 13:
wherein at least one of the NEDs describing one of the plurality of organizations comprises at least one smart contract defined for that organization; and
wherein instantiating the plurality of peer nodes for that organization comprises distributing the at least one smart contract to the plurality of peer nodes.

15. The method of claim 13, further comprising:
establishing a plurality of channels, each channel comprising the BNC system and at least one network entity;
wherein each NED of the plurality of NEDs defines channel membership for the network entity defined by the NED; and
wherein the BNC system monitors each channel and maintains the target network architecture for each channel.

16. The method of claim 13:
wherein storing the cryptographic identities generated for the peer nodes and orderer nodes comprises:
sending each cryptographic identity to a cloud storage communicatively coupled to the BNC system through a physical network; and
storing, for each cryptographic identity stored in the cloud storage, cryptographic material allowing access to the cryptographic identity in the cloud storage, the cryptographic material being stored in the NED associated with the cryptographic identity;
wherein instantiating the plurality of peer nodes further comprises each peer node of the plurality of peer nodes retrieving its cryptographic identity from the cloud storage using the cryptographic material stored in the associated NED; and
wherein instantiating the plurality of orderer nodes further comprises each orderer node of the plurality of orderer nodes retrieving its cryptographic identity from the cloud storage using the cryptographic material stored in the associated NED.

17. The method of claim 13, wherein each ordering membership service provider and each organizational membership service provider comprises a root certificate authority node and an intermediate certificate authority node.

18. The method of claim 13, further comprising instantiating at least one of additional peer nodes and additional orderer nodes in response to an increase in demand for at least one the ordering service and at least one of the plurality of organization.

19. The method of claim 13, wherein at least one NED defines a portion of the target network architecture as having an unbounded number of nodes.

20. The method of claim 13, further comprising:
comparing the permissioned blockchain network with the target network architecture as defined by the plurality of NEDs;
destroying at least a portion of the permissioned blockchain network in response to detecting a deviation between the at least a portion of the permissioned blockchain network and the target network architecture; and
regenerating the permissioned blockchain network by instantiating the portion of the target network architecture that was destroyed, using at least one NED describing the destroyed portion, wherein regenerating the permissioned blockchain network reconciles the permissioned blockchain network with the target network architecture.

* * * * *